United States Patent [19]
Maeno

[11] Patent Number: 5,847,487
[45] Date of Patent: *Dec. 8, 1998

[54] VIBRATION GYROSCOPE AND IMAGE BLUR PREVENTION APPARATUS USING THE SAME

[75] Inventor: Takashi Maeno, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 621,792

[22] Filed: Mar. 28, 1996

[30]    Foreign Application Priority Data

Mar. 29, 1995   [JP]   Japan ..................... 7-071442

[51] Int. Cl.⁶ ................................... H01L 41/08
[52] U.S. Cl. ....................... 310/321; 73/514.34; 310/316; 310/367
[58] Field of Search ..................... 310/316, 321, 310/330–332, 329, 366, 367, 370; 73/504.02, 504.12, 504.16, 514.16, 514.34

[56]              References Cited
               U.S. PATENT DOCUMENTS

| | | | |
|---|---|---|---|
| 4,499,778 | 2/1985 | Westhaver et al. | 74/5 F |
| 4,564,782 | 1/1986 | Ogawa | 310/358 X |
| 5,001,940 | 3/1991 | Ogawa | 74/5.6 D |
| 5,049,776 | 9/1991 | Ogawa | 310/321 |
| 5,216,315 | 6/1993 | Terada et al. | 310/329 |
| 5,426,970 | 6/1995 | Florida et al. | 310/316 X |
| 5,552,658 | 9/1996 | Dibbern et al. | 310/366 |

FOREIGN PATENT DOCUMENTS

0620414A1  10/1994  European Pat. Off. .
 2218914    8/1990  Japan .

*Primary Examiner*—Mark O. Budd
*Attorney, Agent, or Firm*—Fitzpatrick Cella Harper & Scinto

[57]            ABSTRACT

A vibration gyroscope includes a cross-shaped vibration member having two axes perpendicular to each other, an excitation structure for generating a bending vibration such that vibrations along the two axes of the vibration member have opposite phases, and a detecting structure for detecting angular velocities around the two axes of the vibration member during excitation of the bending vibration on the basis of bending displacements.

15 Claims, 10 Drawing Sheets

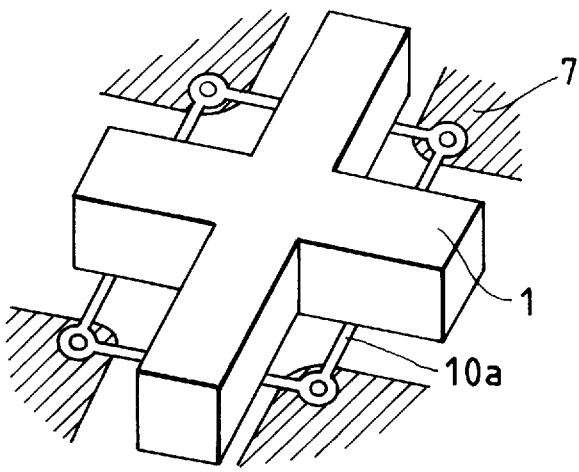
FIG. 12
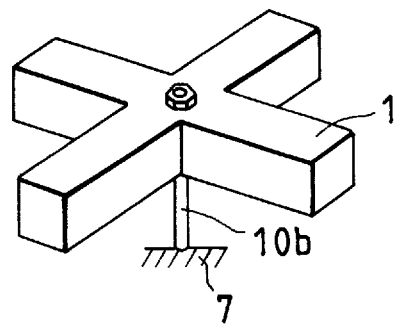
FIG. 13
FIG. 14
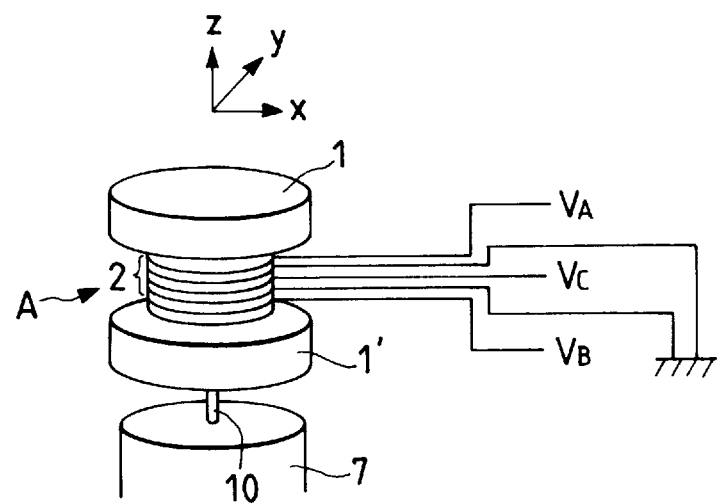

VIBRATION GYROSCOPE AND IMAGE BLUR PREVENTION APPARATUS USING THE SAME

BACKGROUND OF THE INVENTION

1. Field of the Invention

The present invention relates to a vibration gyroscope for detecting an angular velocity and an image blur prevention apparatus using the same.

2. Related Background Art

A vibration gyroscope is known as a means for detecting an angular velocity. The vibration gyroscope is based on the principle that a Coriolis force is generated when an angular velocity is given to an object having a velocity. More specifically, according to this vibration gyroscope, an object is vibrated to have a velocity, and an angular velocity is given to the object. The resultant Coriolis force is received by a spring system. The Coriolis force proportional to the input angular velocity is then detected as the displacement of the spring force, and the information about the angular velocity given to the object is output.

In this vibration gyroscope, an object for applying vibrations, i.e., the vibrator, has the form of a tuning fork, an H-shaped member, or the like. A conventional vibration gyroscope has a single vibrator and is designed to detect rotation only in one plane, i.e., to detect an angular velocity in a uniaxial direction.

If the above conventional uniaxial type vibration gyroscope is mounted on a moving object such as a camera to detect its angular velocity, an accurate angular velocity cannot be detected because two- and three-dimensional angular velocity components are generally generated in the moving object in addition to one-dimensional angular velocity components. That is, the conventional vibration gyroscope capable of detecting angular velocities in only one axial direction is not suitable for the above purpose.

Various types of vibration gyroscopes, each capable of detecting biaxial angular velocity components, have therefore been proposed. The operation principle of such a biaxial type vibration gyroscope will be described below.

FIG. 14 is a perspective view of a conventional biaxial vibration gyroscope. A vibrator A is designed such that piezoelectric elements 2 are clamped/fixed between piezoelectric members 1 and 1'. When an AC voltage $V_c$ having a frequency which is almost equal to the torsion natural frequency of the vibrator A is applied to one of the piezoelectric elements 2, a torsion vibration is generated in the vibrator A. When angular velocities around the x and y axes are given to the vibrator A, bending vibrations within the z-x and y-z planes are caused by Coriolis forces. As a result, AC voltages $V_A$ and $V_B$ proportional the given angular velocities are generated in the piezoelectric elements 2 for detecting distortions due to the respective bending vibrations.

A support member 10 supports the vibrator A on a support base 7.

According to the above prior art, however, since several piezoelectric elements 2 are clamped and fixed between the vibration members 1 and 1', the number of parts is large. As a result, a complicated assembly process is required, and high-precision assembly is difficult to perform. In addition, this structure is long in the axial direction, a large space is required to mount it.

SUMMARY OF THE INVENTION

According to one aspect of the invention, there is provided a vibration gyroscope having a cross-shaped vibrator to cause a bending vibration mode such that vibrations along two axes of the vibrator have opposite phases, and to detect displacements caused by angular velocities around the two axes of the vibrator.

BRIEF DESCRIPTION OF THE DRAWINGS

FIGS. 1A and 1B show the first embodiment of the present invention, in which FIG. 1A is a block diagram showing a vibration gyroscope, and FIG. 1B is a schematic perspective view of an image blur prevention apparatus;

FIGS. 4A to 4C show signal waveforms associated with the vibrator according to the first embodiment of the present invention, in which FIG. 4A shows a potential generated at a side surface of the vibrator in the x-axis direction, FIG. 4B shows an amplitude-modulated signal based on an angular velocity, and FIG. 4C shows an angular velocity signal obtained by demodulating the amplitude-modulated signal;

FIGS. 7A to 7C are exploded views of a vibrator according to the fourth embodiment of the present invention, in which FIG. 7A is a plan view of the uppermost piezoelectric element plate; FIG. 7B is a plan view of the intermediate piezoelectric element plate; and FIG. 7C is a plan view of the lowermost piezoelectric element plate;

FIGS. 8A and 8B show a vibrator according to the fourth embodiment of the present invention, in which FIG. 8A is a perspective view of the vibrator, and FIG. 8B is a sectional view of the vibrator;

FIGS. 9A and 9B show the vibrator according to the fourth embodiment of the present invention, in which FIG. 9A is a perspective view showing the excited state of an excitation mode in the z-axis direction, and FIG. 9B is a plan view showing the excited state in FIG. 9A;

FIG. 12 is a perspective view of a vibration gyroscope according to the sixth embodiment of the present invention;

FIG. 13 is a perspective view of a vibration gyroscope according to the seventh embodiment of the present invention; and FIG. 14 is perspective view of a conventional vibration gyroscope.

DETAILED DESCRIPTION OF THE PREFERRED EMBODIMENTS

Figure 1A:
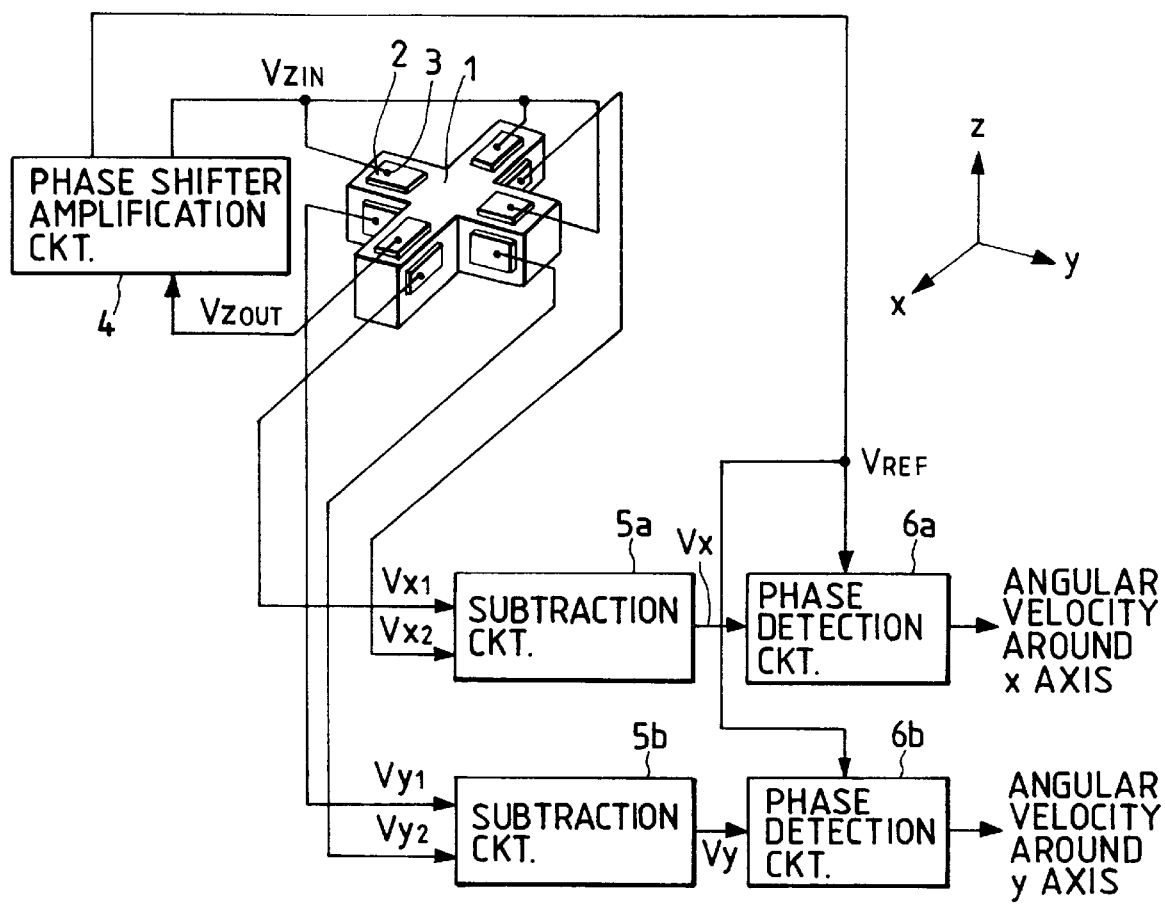
Figure 1B:
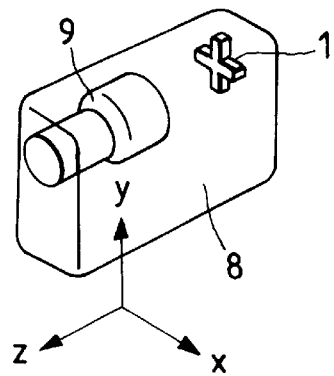

FIGS. 1A and 1B show the first embodiment of the present invention.

FIG. 1A shows a vibrator and a circuit block. A metal vibration member 1 is a cross-shaped member when viewed from the top. This vibration member is designed such that piezoelectric elements 2 as energy conversion elements are mounted on the surfaces of the four arm portions on the same plane, and piezoelectric elements 2 are mounted on side surfaces of the respective arm portions. Each piezoelectric element 2 has a function of converting an applied electrical signal into a mechanical displacement, and a function of converting the expansion-shrinkage displacement (distortion) of the vibration member surface to which the piezoelectric element is bonded into an electrical signal. These signals are input/output to/from the circuit via electrodes 3 printed on the respective piezoelectric elements 2.

Figure 2:
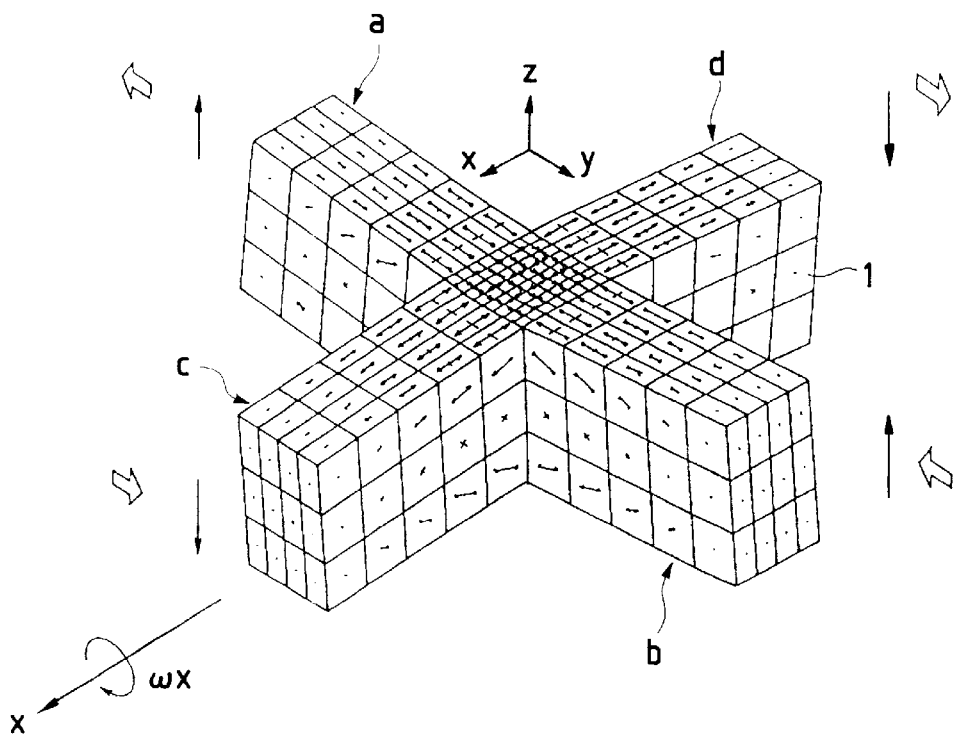
FIG. 2 is a perspective view showing a vibration mode of a vibrator according to the first embodiment of the present invention.

A phase shifter amplification circuit 4 receives a signal $V_{ZOUT}$ from one piezoelectric element 2, and outputs a signal $V_{ZIN}$ to the three remaining piezoelectric elements 2 on the same plane to cause self-excited vibration. As shown in FIG. 2, in the self-excited vibration mode of the vibration member 1, when two arms a and b opposing each other along the y-axis direction bend in the positive z-axis direction, two arms c and d opposing each other along the x-axis direction bend in the negative z-axis direction.

Figure 3:
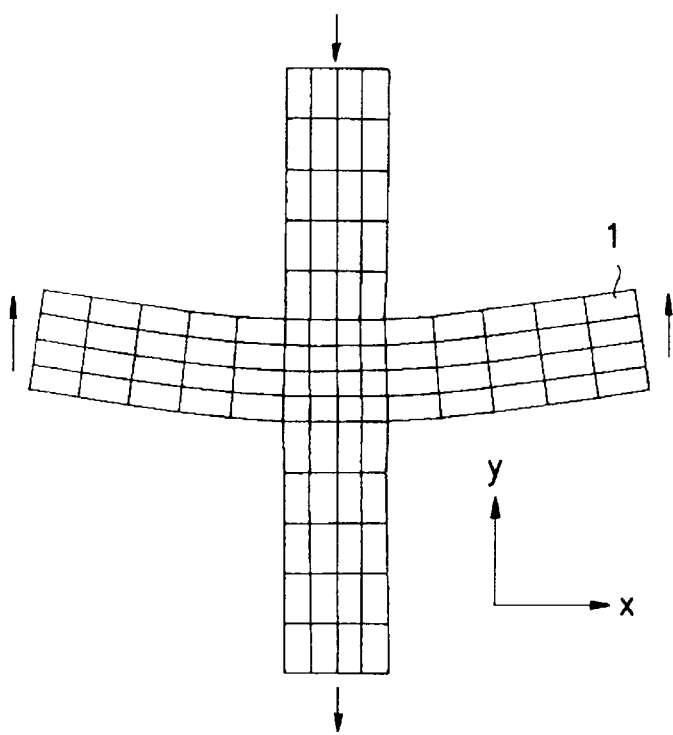
FIG. 3 is a plan view showing a vibration mode of the vibrator according to the first embodiment of the present invention.

Assume that when an angular velocity $\omega_x$ is given around the x axis, the vibrator has a velocity vector in the direction indicated by an arrow "↑" or "↓". In this case, a Coriolis force is generated in the direction indicated by the outline arrow perpendicular to the rotation axis (x axis) and the velocity vector. Since the vibrator has a natural bending mode in the y-axis direction, if the natural frequency of this mode is almost equal to that of the self-excited vibration mode, the vibration of a mode like the one shown in FIG. 3 is caused by the Coriolis force. Note that the meshes in FIGS. 2 and 3 are meshes drawn for finite element analysis.

Figure 4A:
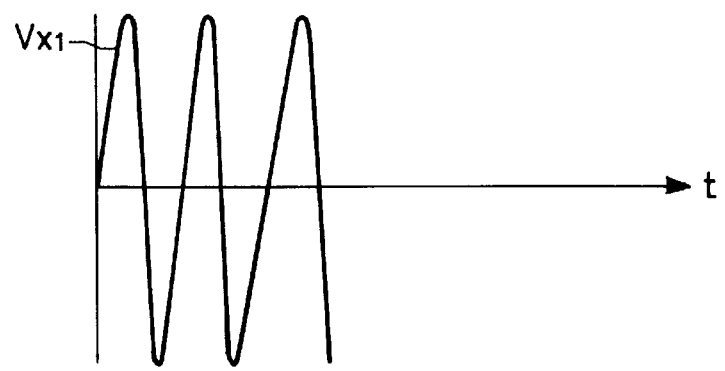
Figure 4B:
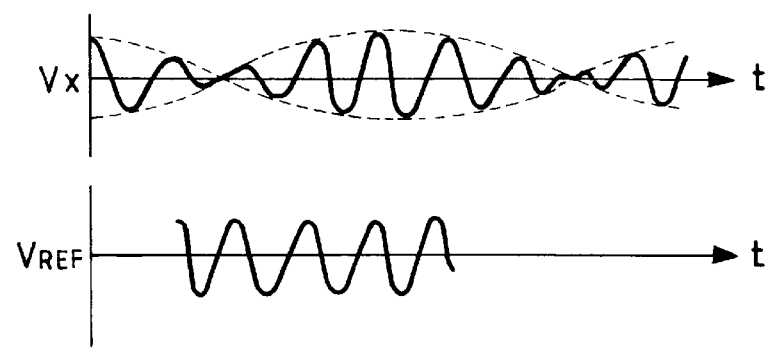
Figure 4C:

In the mode in FIG. 3, a surface of side of the arm in the x-axis direction expand and shrink. Therefore, at least one pair of piezoelectric elements 2 which generate potentials $V_{x1}$ and $V_{x2}$ having opposite signs upon expansion/shrinkage are bonded to side surfaces of the arms in the x-axis direction. For example, one of piezoelectric elements 2 may be provided as shown in FIG. 1A, or two pairs of piezoelectric elements may be bonded to both side surfaces of the arms. As described above, since the potentials $V_{x1}$ and $V_{x2}$ have opposite phases, a signal $V_x$ is obtained by multiplying the two potentials by a proper coefficient and subtracting one product from the other product using a subtraction circuit 5a. The signal $V_x$ is almost 0 when the angular velocity $\omega_x$ is not given to the vibrator, but becomes an AM wave obtained by modulating a signal having a self-excited vibration frequency with the amplitude of the angular velocity $\omega_x$. When the AM wave $V_x$ is detected (demodulated) by a phase detection circuit 6a using a reference signal $V_{REF}$, an angular velocity signal $V_{xout}$ like the one shown in FIG. 4C is obtained.

The same applies to a case wherein an angular velocity $\omega_y$ is given around the y axis. That is, a vibration mode (equivalent to a mode obtained by rotating the structure in FIG. 3 about the z axis) generated in the x-axis direction by a Coriolis force is converted into potentials $V_{y1}$ and $V_{y2}$ having opposite signs by one or two pairs of piezoelectric elements 2. The potentials are multiplied by a proper coefficient, and one product is subtracted from the other product using a subtraction circuit 5b to obtain a signal $V_y$. AM detection (demodulation) of the signal $V_y$ is performed by a phase detection circuit 6b. As a result, an angular velocity signal $V_{yout}$ around the y axis is generated.

Assume that such a vibration gyroscope is mounted in a vibrating system 8, e.g., a camera or video camera, as shown in FIG. 1B. In this case, if angular velocity signals around x and y axes are input to an image blur prevention apparatus 9, e.g., a variangle prism used to correct a low-frequency camera shake, a biaxial image blur prevention (e.g., camera shake correction) apparatus using the vibration gyroscope can be realized.

According to this embodiment, since the number of parts is small, a biaxial detection vibration gyroscope and an image blur prevention apparatus using the gyroscope can be easily manufactured with high precision. In addition, since the gyroscope and the image blur prevention apparatuses are small in size in the z-axis direction, they do not require any large space for installation.

The same reference numerals in the following embodiments denote the same parts as in the first embodiment, and a description thereof will be omitted.

(Second Embodiment)

Figure 5:
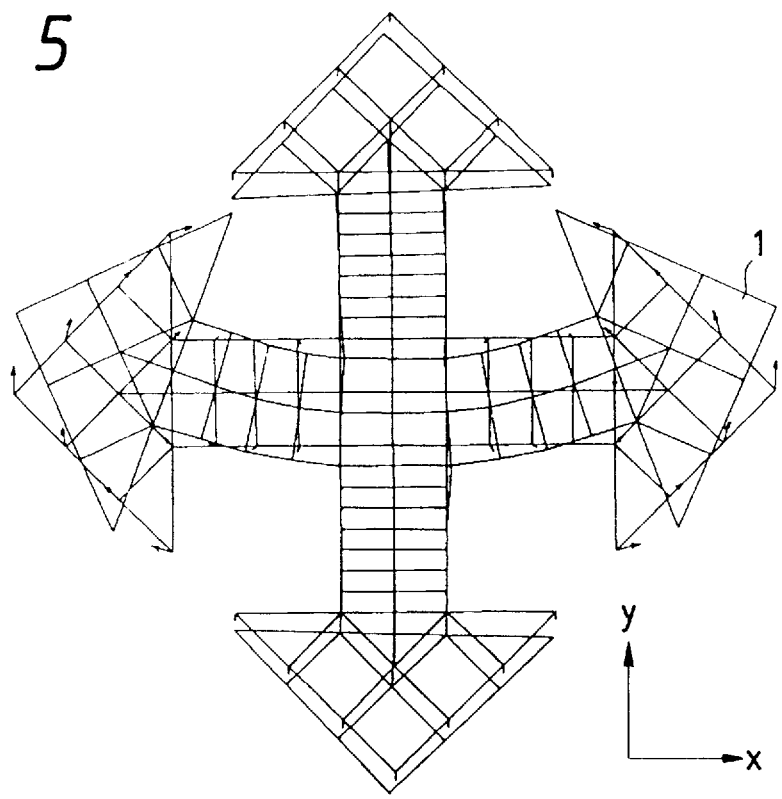
FIG. 5 is a plan view showing a vibration mode of a vibrator according to the second embodiment of the present invention.

FIG. 5 shows the second embodiment of the present invention.

FIG. 5 shows an infinite element analysis result of the detection mode (the mode of vibration in the y-axis direction) of a vibrator in the second embodiment.

In this embodiment, the distal ends of four arms in the x- and y-axis directions have triangular portions. FIG. 5 corresponds to FIG. 3 in the first embodiment. The second embodiment is different from the first embodiment in the shape of the distal end of each arm. The two embodiments, however, operate in the same manner.

In the second embodiment, since the mass of each distal end is larger, a Coriolis force F given by $$F = 2m\omega v$$

(where m is the mass of the vibrator, $\omega$=the angular velocity, and v is the velocity given by excited vibration) is larger, the detection sensitivity for the angular velocity $\omega$ can be improved.

In addition, owing to the effect of the mass of each distal end, the moment of inertia increases. As a result, three natural frequencies (one excitation frequency and two detection frequencies) decrease. If the natural frequencies of this structure are equal to those of the simple cross-shaped structure, the size in the y direction can be decreased.

(Third Embodiment)

Figure 6:
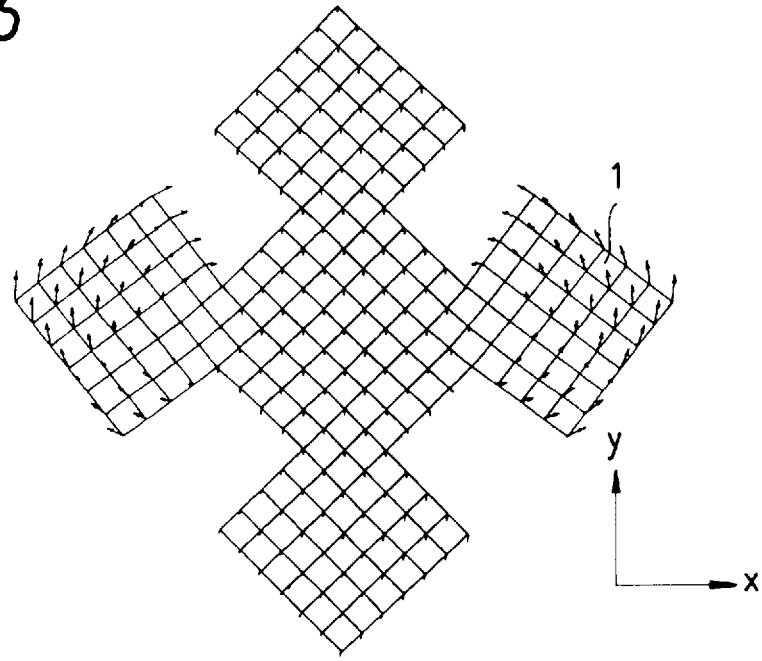
FIG. 6 is a plan view showing a vibration mode of a vibrator according to the third embodiment of the present invention.

FIG. 6 shows the third embodiment of the present invention.

FIG. 6 shows an infinite element analysis result of a detection mode of a vibrator in the third embodiment.

In this embodiment, the distal ends of four arms in the x- and y-axis directions have rectangular portions. FIG. 6 corresponds to FIG. 3 in the first embodiment. The third embodiment is different from the first embodiment in the shape of the distal end of each arm. The two embodiments, however, operate in the same manner.

In the third embodiment, since the mass of each distal end is larger, a Coriolis force F given by $$F = 2m\omega v$$

(where m is the mass of the vibrator, $\omega$=the angular velocity, and v is the velocity given by excited vibration) is larger, the detection sensitivity for the angular velocity $\omega$ can be improved.

In addition, owing to the effect of the mass of each distal end, the moment of inertia increases. As a result, three natural frequencies (one excitation frequency and two detection frequencies) decrease. Alternatively, the sizes of this structure in the x and y directions can be decreased as compared with the simple cross-shaped structure. In addition, since the shape of this embodiment is obtained by forming four notches in a rectangular plate, the third embodiment can be processed easier than the second embodiment in FIG. 5.

(Fourth Embodiment)

FIGS. 7A to 8B show the fourth embodiment of the present invention.

Figure 7A:
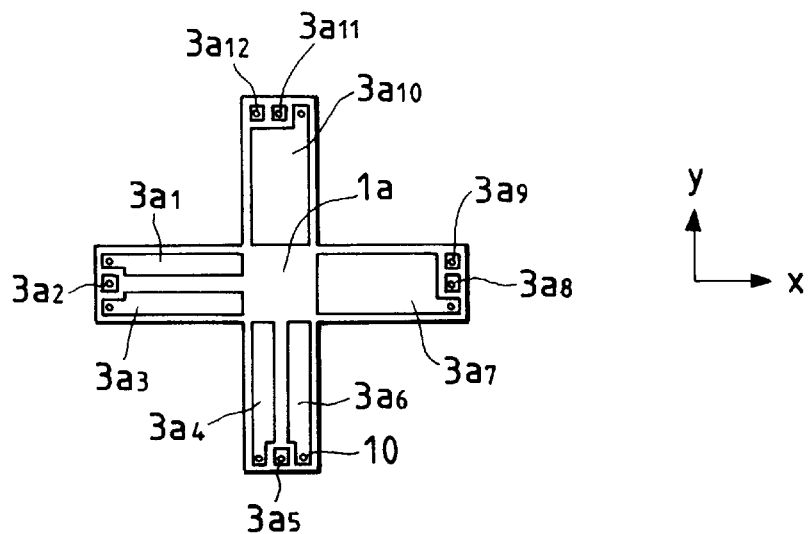
Figure 7B:
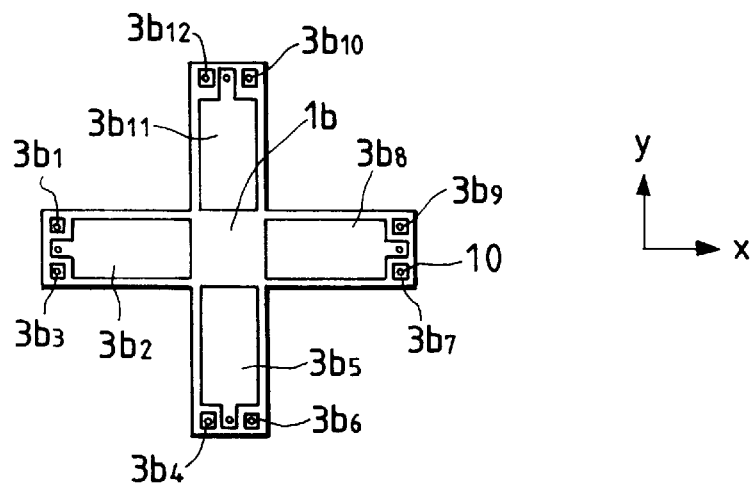
Figure 7C:
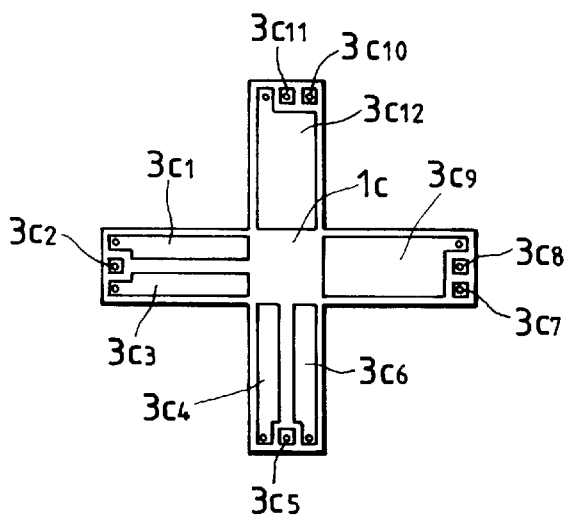

In each embodiment described above, the vibrator is formed by providing the piezoelectric elements 2 for the metal vibration elastic member 1. In this embodiment, however, a cross-shaped vibration member itself is formed by using a laminated type piezoelectric element. FIGS. 7A, 7B, and 7C are plan views respectively showing piezoelectric element plates 1a, 1b, and 1c forming layers. Electrode patterns $3a_1$ to $3a_{12}$ are formed on the piezoelectric element plate 1a on the uppermost layer shown in FIG. 7A. Electrode patterns $3b_1$ to $3b_{12}$ are formed on the piezoelectric element plate 1b on the intermediate layer shown in FIG. 7B. Electrode plate patterns $3c_1$ to $3c_{12}$ are formed on the piezoelectric element plate 1c on the lower most layer, as shown in FIG. 7C. Note that the affix of each of reference numerals (1 to 12) denoting these electrode patterns indicates a group of electrode patterns which are electrically connected to each other. This structure includes through holes 10.

As described above, the piezoelectric element plates 1a, 1b, and 1c respectively having the electrodes 3a, 3b, and 3c formed on one surface side of a vibration member are laminated such that the lower surfaces of the piezoelectric members on the respective layers are bonded/clamped to/between the adjacent electrodes, thereby forming a vibrator.

Figure 8A:
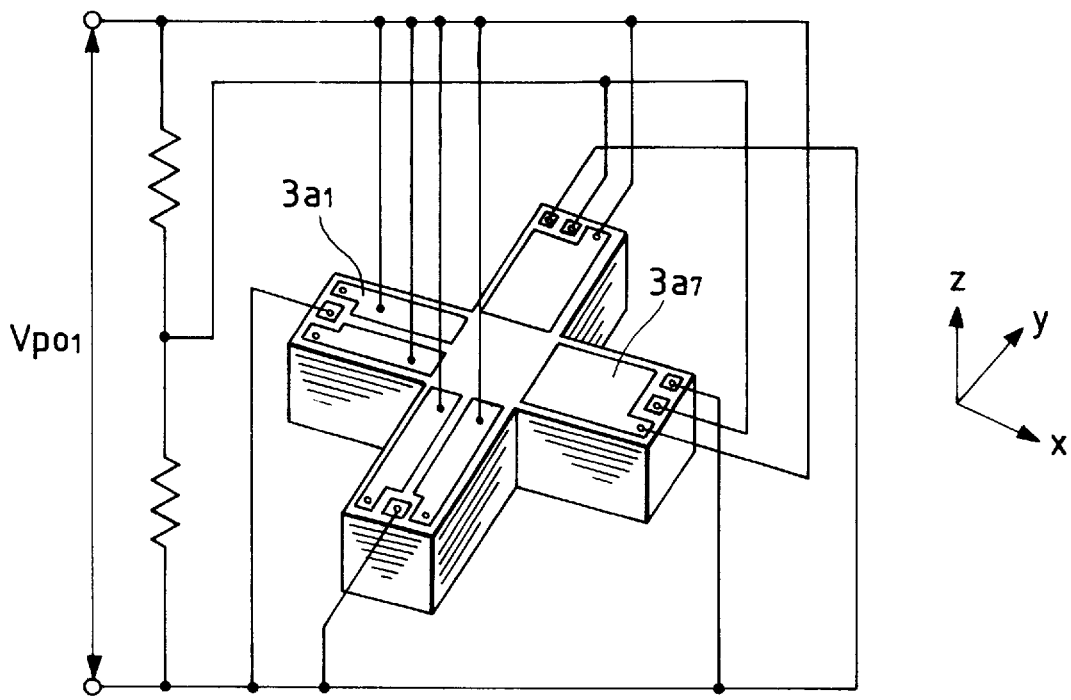

As shown in FIG. 8A, polarization processing of the vibration member as this laminated type piezoelectric element is performed by wiring the electrodes 3a on the uppermost layer and applying a high voltage $V_{pol}$.

Figure 8B:
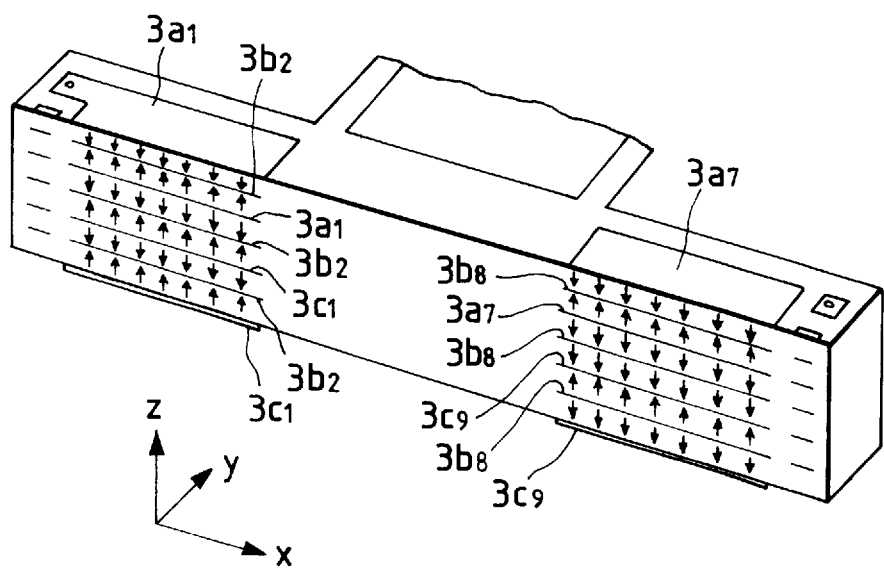

With the polarization processing shown in FIG. 8A, the inner portions of the laminated piezoelectric element are polarized in the directions indicated by the arrows in FIG. 8B. More specifically, the portions under an electrode pattern $3a_1$ on the left side in FIG. 8B are alternately polarized upward and downward, starting with the uppermost portion. The portions above an electrode pattern $3a_7$ on the right side in FIG. 8B are polarized such that the two portions are alternately polarized downward and upward, the portions above and under an electrode pattern $3b_8$ are polarized in the same direction, and the two lower portions are alternately polarized.

Figure 9A:
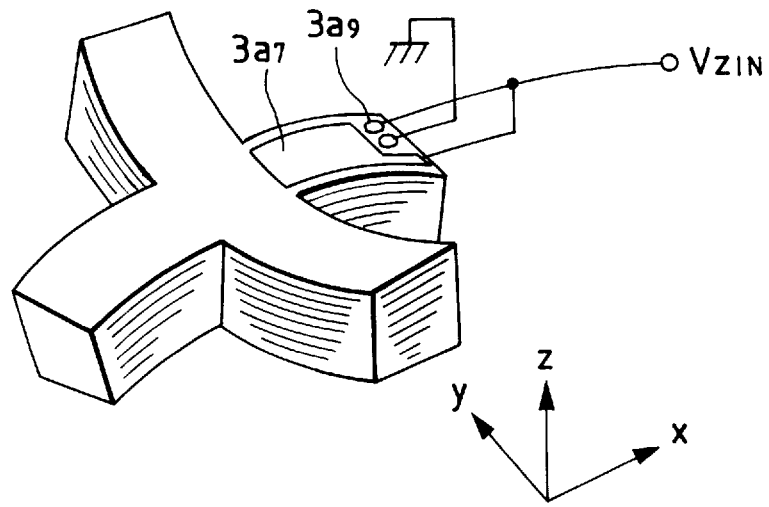

When the signal $V_{ZIN}$ is applied to the electrode patterns $3a_7$ and $3a_9$ of this laminated piezoelectric element, the upper portion expands, and the lower portion shrinks, as shown in FIG. 9A. As a result, an excitation mode in the z-axis direction is excited.

Figure 9B:
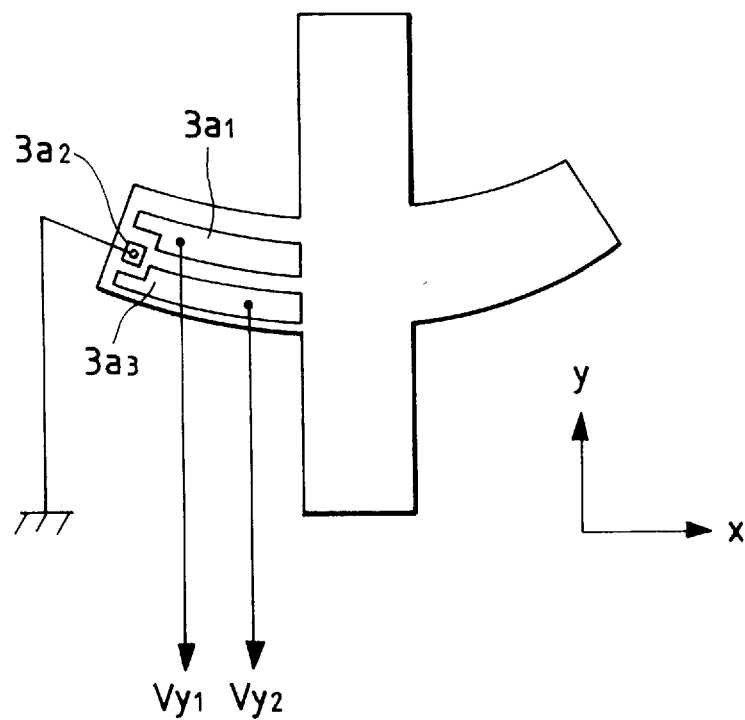

When a mode of deformation in the y-axis direction is caused as shown in FIG. 9B, the portion under the electrode pattern $3a_1$ shrinks, and the portion under the electrode pattern $3a_3$ expands. As a result, signals $V_{y1}$ and $V_{y2}$ having opposite signs are generated by the electrode patterns $3a_1$ and $3a_3$.

Figure 10:
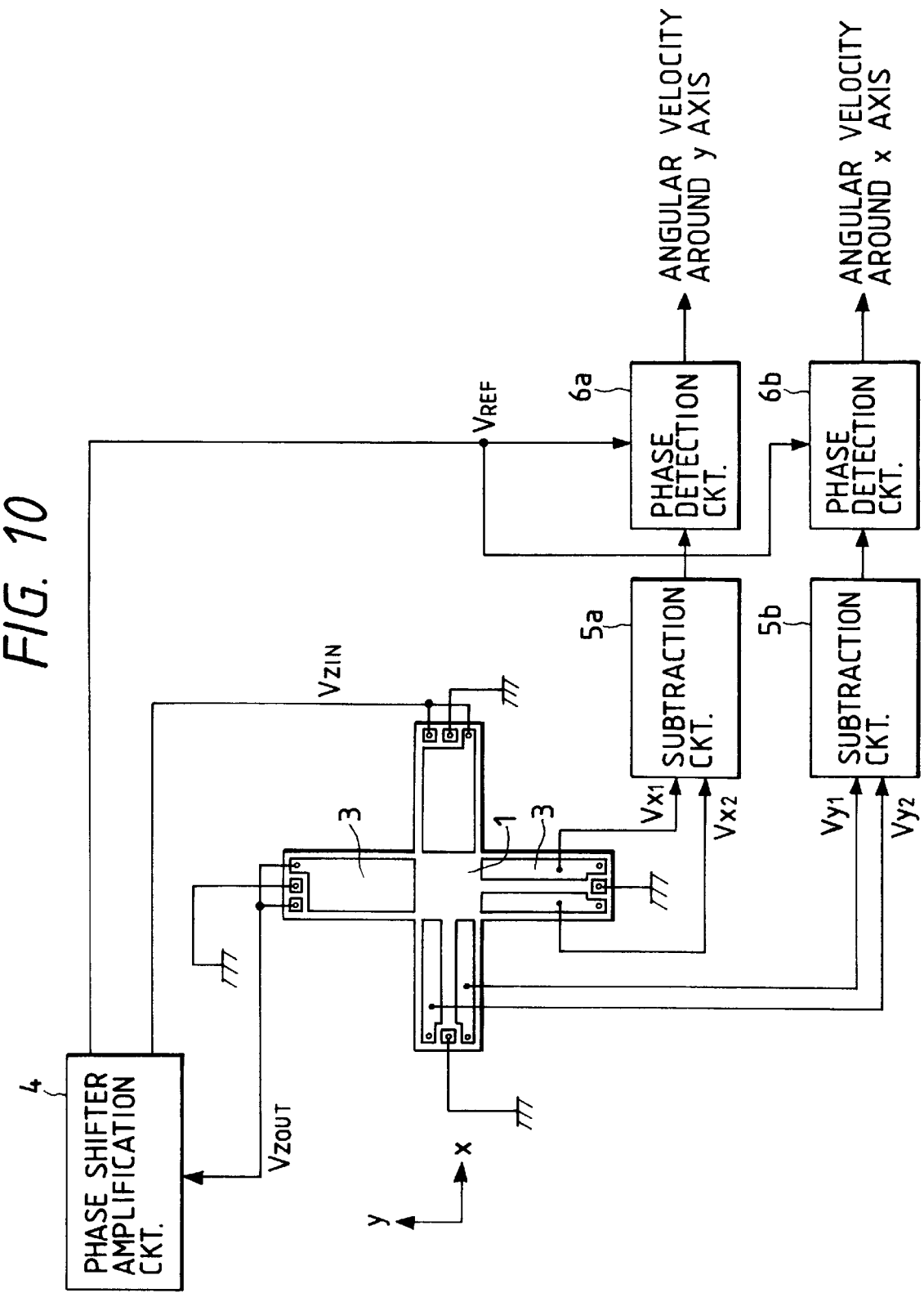
FIG. 10 is a block diagram showing the fourth embodiment of the present invention.

When this laminated piezoelectric element is connected to the circuit shown in FIG. 10, a vibration gyroscope capable of detecting angular velocities around two axes, similar to the first embodiment shown in FIGS. 1A and 1B, can be realized. According to the effect of this embodiment, since piezoelectric elements are laminated to obtain a large effective area. For this reason, the amplitude of the excitation mode can be increased, and the charge amount of a detection signal can be increased to improve the detection precision.

(Fifth Embodiment)

Figure 11:
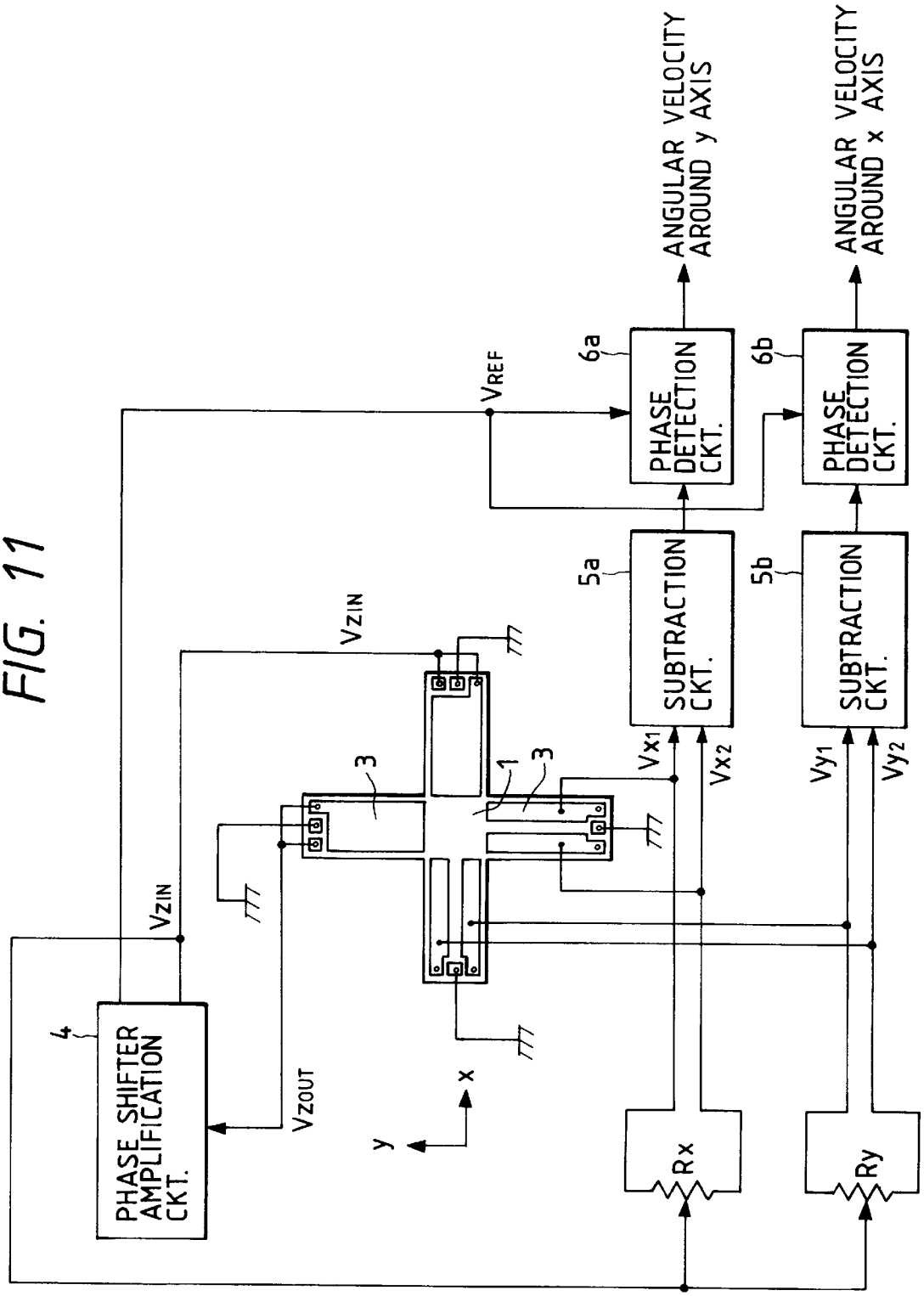
FIG. 11 is a block diagram showing the fifth embodiment of the present invention.

FIG. 11 shows the fifth embodiment of the present invention. This embodiment is characterized in that an applied voltage $V_{ZIN}$ is superposed on potentials $V_{x1}$, $V_{x2}$, $V_{y1}$, and $V_{y2}$ through variable resistors $R_x$ and $R_y$.

Such a circuit arrangement can improve the angular velocity detection precision by removing unnecessary voltages contained in the potentials $V_{x1}$, $V_{x2}$, $V_{y1}$, and $V_{y2}$ generated upon expansion or shrinkage.

The electrode patterns in the fourth and fifth embodiments may be changed. More specifically, arbitrary patterns can be formed as long as modes of vibration in the z-axis direction can be alternately caused in the cross-shaped vibration member, and bending displacements in the x- and y-axis directions can be detected.

(Sixth Embodiment)

FIG. 12 is a perspective view showing the sixth embodiment of the present invention (no electrodes are shown). A vibration member 1 is supported/fixed to a support base 7 through an elastic support member 10a in the form of a loop. It suffices if the elastic support member 10a is positioned and shaped to minimize its influence on three vibration modes used for excitation and detection.

(Seventh Embodiment)

FIG. 13 is a perspective view showing the seventh embodiment of the present invention (no electrodes are shown). A vibration member 1 is fixed to a support base 7 through a rod-like elastic support member 10b. Note that the elastic support member 10b is a shaft whose thickness and length are set to minimize its influence on three vibration modes used for excitation and detection.

According to the sixth and seventh embodiments, since the vibration members 1 can be fixed, angular velocities can be detected with high precision. Since the two vibration members have different shapes, they may be selectively used in accordance with spaces where they are mounted.

According to each embodiment described above, since the vibrator is constituted by the cross-shaped vibration member having two axes perpendicular to each other, angular velocity components around the two axes can be simultaneously detected. In addition, the shape of the vibration member can be simplified, and hence the number of parts can be reduced. Consequently, the assembly process can be simplified, and the manufacturing/assembly precision can be improved. Furthermore, since the size of the vibration member in the bending/vibrating direction can be reduced, the space required in the bending/vibration direction can be reduced as compared with the prior art.

According to the fourth embodiment, in particular, since an increase in effective area can be attained by the laminated piezoelectric element, the amplitude of an excitation mode and the polarization charge amount of a detection signal can be increased to improve an output of angular velocity signal detection.

According to the second and third embodiments, by increasing the mass of the distal end of each arm of a vibration displacement enlargement structure such as a cross-shaped vibration member, a Coriolis force generated upon occurrence of an angular velocity can be increased to improve the angular velocity detection sensitivity. In addition, since the moment of inertia increases, the natural frequencies of one excitation mode and two angular velocity signal detection mode can be decreased. Under the same natural frequency condition, by minimizing the sizes of the arms in the two axes, the vibration member can be reduced in size as compared with a simple cross-shaped vibration member.

According to the sixth and seventh embodiments, since the vibration members can be supported in a buffered state, angular velocities can be detected with high precision.

As shown in FIG. 1B, image blur prevention around two axes can be easily performed by using the vibration gyroscope of each embodiment described above as a vibration sensor for a correction variangle lens used to correct a low-frequency camera shake caused when a user holds a camera or video camera with his/her hand.

What is claimed is:

1. A vibration gyroscope comprising:

a cross-shaped vibration member having two axes perpendicular to each other, said cross-shaped vibration member comprising a plurality of arms, each arm having a respective end portion integrally formed at a distal end of said arm, wherein a width of at least a part of said respective end portion is treater than a width of said arm so that said respective end portion protrudes width-wise from said arm;

an excitation structure for generating bending vibrations such that vibrations along the two axes of said vibration member have opposite phases; and a detecting structure for detecting angular velocities around the two axes of said vibration member during excitation of the bending vibrations on the basis of bending displacements.

2. A gyroscope according to claim 1, wherein said excitation structure includes an electro-mechanical energy conversion element joined to said vibration member.

3. A gyroscope according to claim 1, wherein said detecting structure includes a mechano-electrical energy conversion element joined to said vibration member.

4. A gyroscope according to claim 2, wherein said detecting structure includes a mechano-electrical energy conversion element joined to said vibration member.

5. A gyroscope according to claim 1, wherein said cross-shaped vibration member has a uniform thickness in directions perpendicular to the two axes.

6. A gyroscope according to claim 1, wherein said vibration member is supported by an elastic support member.

7. A gyroscope according to claim 4, wherein said vibration member is supported by an elastic support member.

8. An image blur prevention apparatus using a vibration gyroscope, said vibration gyroscope comprising:

a cross-shaped vibration member having two axes perpendicular to each other, said cross-shaped vibration member comprising a plurality of arms, each arm having a respective end portion integrally formed at a distal end of said arm, wherein a width of at least a part of said respective end portion is greater than a width of said arm so that said respective end portion protrudes width-wise from said arm;

an excitation structure for generating bending vibrations such that vibrations along the two axes of said vibration member have opposite phases; and a detecting structure for detecting angular velocities around the two axes of said vibration member during excitation of the bending vibrations on the basis of bending displacements.

9. An apparatus according to claim 8, wherein said excitation structure includes an electromechanical energy conversion element joined to said vibration member.

10. An apparatus according to claim 9, wherein said detecting structure includes a mechano-electrical energy conversion element joined to said vibration member.

11. An apparatus according to claim 8, wherein said vibration member is supported by an elastic support member.

12. A vibration gyroscope comprising:

a cross-shaped vibration member having X and Y axes perpendicular to each other, said vibration member comprising an energy conversion driving element polarized in a Z axis direction perpendicular to both the X and Y axes;

an excitation structure for generating bending vibrations using said energy conversion driving element such that vibrations along the X and Y axes of said vibration member have opposite phases, said excitation structure including a plurality of driving electrodes which are arranged on a surface of said vibration member; and a detection structure for detecting angular velocities around the X and Y axes of said vibration member during excitation of the bending vibrations on the basis of bending displacement, said detection structure including an energy conversion detecting element which is polarized in the Z axis direction, and a plurality of arrays, each array comprising a plurality of detecting electrodes, said plurality of detecting electrodes being arranged on the same surface of said vibration member on which said plurality of driving electrodes are arranged.

13. A gyroscope according to claim 12, wherein said vibration member is supported by an elastic member.

14. An image blur prevention apparatus using a vibration gyroscope, said vibration gyroscope comprising:

a cross-shaped vibration member having X and Y axes perpendicular to each other, said vibration member comprising an energy conversion driving element polarized in a Z axis direction perpendicular to both the X and Y axes;

an excitation structure for generating bending vibrations using said energy conversion driving element such that vibrations along the X and Y axes of said vibration member have opposite phases, said excitation structure including a plurality of driving electrodes which are arranged on a surface of said vibration member; and a detection structure for detecting angular velocities around the X and Y axes of said vibration member during excitation of the bending vibrations on the basis of bending displacement, said detection structure including an energy conversion detecting element which is polarized in the Z axis direction, and a plurality of arrays, each array comprising a plurality of detecting electrodes, said plurality of detecting electrodes being arranged on the same surface of said vibration member on which said plurality of driving electrodes are arranged.

15. An apparatus according to claim 14, wherein said vibration member is supported by an elastic member.

* * * * *